May 15, 1956 C. F. KOENIG 2,745,460
TIRE TRACK-PARTIAL ENGAGEMENT TYPE
Filed Feb. 9, 1953 3 Sheets-Sheet 1

INVENTOR.
Carl F. Koenig
BY
Hyde, Meyer, Baldwin & Doran
ATTORNEYS

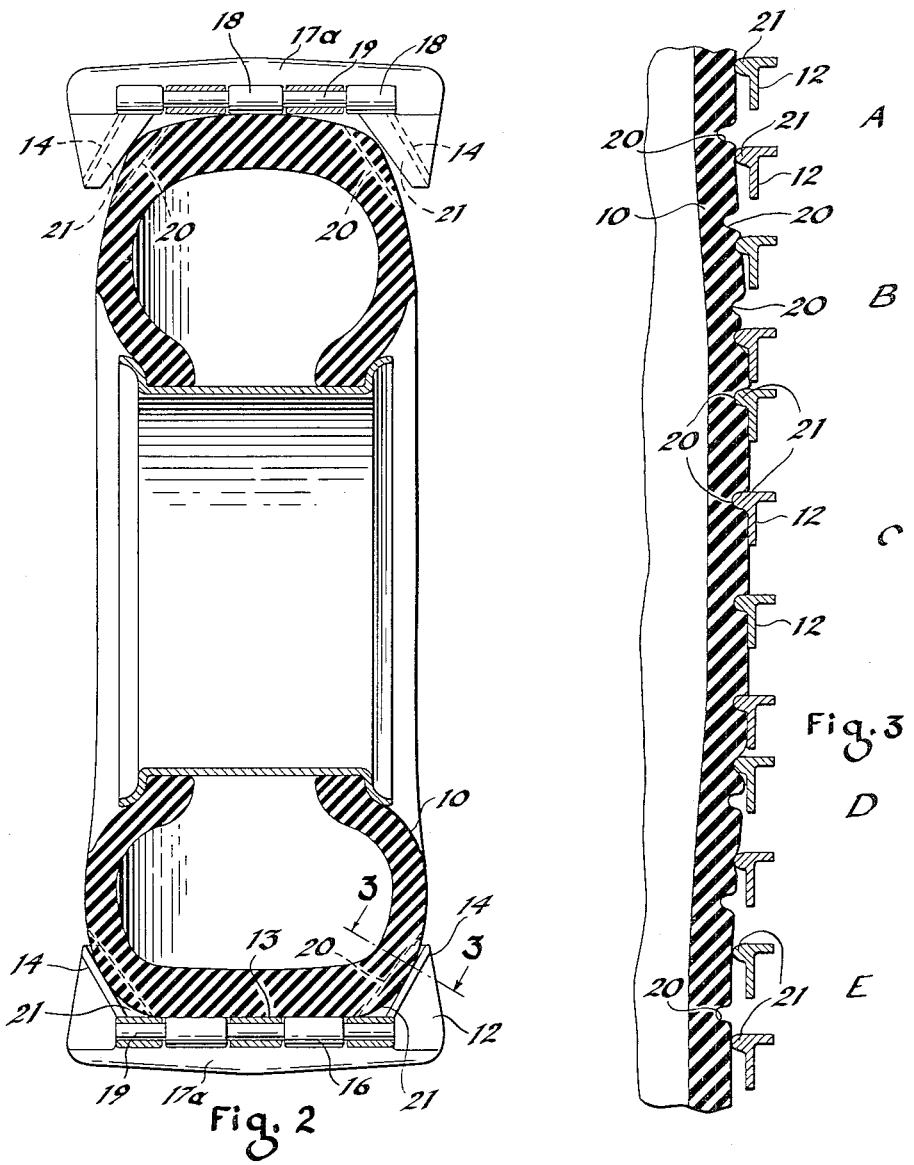

May 15, 1956 C. F. KOENIG 2,745,460
TIRE TRACK-PARTIAL ENGAGEMENT TYPE
Filed Feb. 9, 1953 3 Sheets-Sheet 3

INVENTOR.
*Carl F. Koenig*
BY
*Hyde, Meyer, Baldwin & Doran*
ATTORNEYS

United States Patent Office 2,745,460
Patented May 15, 1956

2,745,460

TIRE TRACK—PARTIAL ENGAGEMENT TYPE

Carl F. Koenig, Lyndhurst, Ohio, assignor, by mesne assignments, to General Motors Corporation, Detroit, Mich., a corporation of Delaware Application February 9, 1953, Serial No. 335,781

3 Claims. (Cl. 152—182)

This invention relates to improvements in a combination of a large pneumatic tire and an endless track completely surrounding and partially embracing the tire, said track comprising a plurality of rigid shoes with articulating connections between adjacent shoes.

One of the objects of the present invention is to provide a novel combination between a large size pneumatic tire having grooves or indentations at least in the zones where the side walls meet the tread of the tire, together with an endless track comprising a plurality of rigid shoes having a driving engagement with the tire, entering into the grooves or recesses thereof, where it is flat on the ground under load, but otherwise the track being free to creep along the tire.

The preferred embodiment shown for carrying out the purpose expressed in the preceding paragraph comprises a track composed of shoes which have a flat mid-portion extending across the major portion of the tread of the tire, each of these shoes having end portions extending radially inwardly from the ends of the mid-portion of the shoe, these end portions having ridges which extend inwardly therefrom in position to enter into the grooves or recesses in those portions only where the tire bulges laterally outwardly under load where it contacts the ground.

Other objects and advantages of my invention will be apparent from the accompanying drawings and description, and the essential features thereof will be set forth in the appended claims.

In the drawings,

Fig. 1 is a side elevational view showing a pneumatic tire with my improved endless track in position on the tire, and with the entire combination under load. In the upper left-hand portion of this view the tire is shown in side elevation while the track shoes are shown in central sectional view, and in the upper right-hand portion of this view the tire has been completely cut away and the track shoes are shown in central sectional view;

Fig. 2 is a transverse sectional view taken along the line 2—2 of Fig. 1;

Fig. 3 is a sectional view taken along the line 3—3 of Fig. 2 and extending around that portion of the tire indicated on the lines 3—3 of Fig. 1;

Fig. 4 is a top plan view enlarged of a portion of the track flattened against the ground, this view being taken from the position of the lines 4—4 of Fig. 1 with the tire omitted; while

Off-the-highway vehicles use large pneumatic tires both for the purpose of carrying the load and for the purpose of floating the load on a large supporting area, this being especially necessary where ground conditions are poor for supporting loads, such as in mud and sand.

With the increasing use of greater power for driving such vehicles, it is necessary to increase the tractive effect of such tires in order to handle the loads involved. The present invention applies an endless track of metal shoes surrounding the entire tread of the tire and extending slightly around the side walls of the tire so as to give a protective effect to the pneumatic tire and at the same time to increase the tractive effect when such tires are driven in order to propel the vehicle. The tire illustrated herein is an 18.00 x 25 tire which means that its overall diameter is approximately five feet. My invention is intended for successful operation with tires of this size or larger and utilizing internal pressures of between 25 and 35 pounds per square inch or less.

The tire 10 illustrated herein is of this character. It will be understood that such tires usually have inner tubes but for clarity the inner tube has been omitted from Fig. 2.

Figure 4:
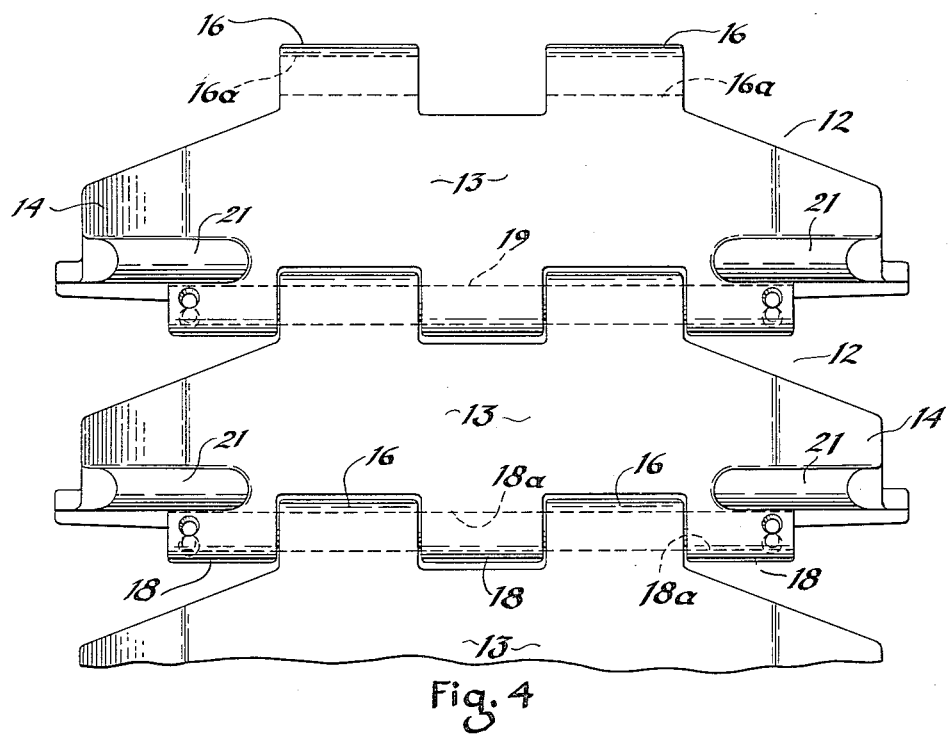
Figure 5:
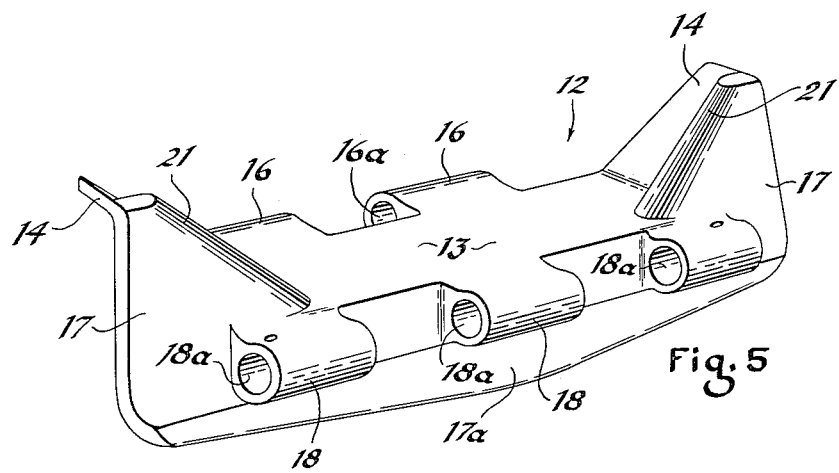
Fig. 5 is a perspective view of a single shoe of the track.

The track 11 is composed of a plurality of rigid shoes 12, preferably of steel or iron, and having articulating or hinged connections between adjacent shoes. One of these shoes is more clearly seen in Figs. 4 and 5. Preferably, each shoe is longer crosswise of the tire than its extent circumferentially of the tire. Each shoe has a flat tread-engaging mid-portion 13 which extends crosswise of the tread for a major portion of the width of the tread as clearly seen at the top of Fig. 2. At each end of this mid-portion, wing portions 14 are provided which extend generally radially inwardly from the ends of the mid-portion and partially embrace the side walls of the tire. Preferably, these wing portions flare outwardly and upwardly from the mid-portion 13 as viewed in Fig. 5. The portions 13 and 14 are of metal of comparatively uniform thickness, and of such a thickness to give sufficient strength to the shoe, but without being very heavy. This same thickness of metal is bent downward at one side as indicated at 15 in Fig. 1 to provide a wall from which extend two hinge lugs 16 having through openings 16a to receive hinge pins. On the other side of the shoe, a wall 17 extends downwardly from the portions 13 and 14 and this wall is preferably extended on down beyond the mid-portion 13 to form a grouser 17a extending from side to side of the shoe. From the wall 17, the hinge lugs 18, three of them, extend in a direction opposite the hinge lug 16. These lugs also have through openings 18a to receive hinge pins. The lugs 16 and 18 are so spaced that the lugs 16 fit snugly between the lugs 18 of the adjacent shoe when the track is assembled as shown in Fig. 4. Hinge pins 19 are then passed through the lugs 16 and 18.

My improved track is designed for operation with a tire having evenly spaced grooves or recesses 20 extending more or less crosswise of the tire, at least in the zones where the side walls meet the tread. It will be understood that wherever I have referred to these recesses as "grooves" and have referred to them as extending "crosswise" of the tire, any deformation in the tire which permits it to be locked to my improved shoe, shown herein, is satisfactory for the operation of my invention.

It will be understood, looking at Fig. 2, that the grooves 20 might extend entirely across the tread of the tire, but they are utilized for locking the tire and the track together only at those zones where the side walls meet the tread of the tire.

Figure 1:
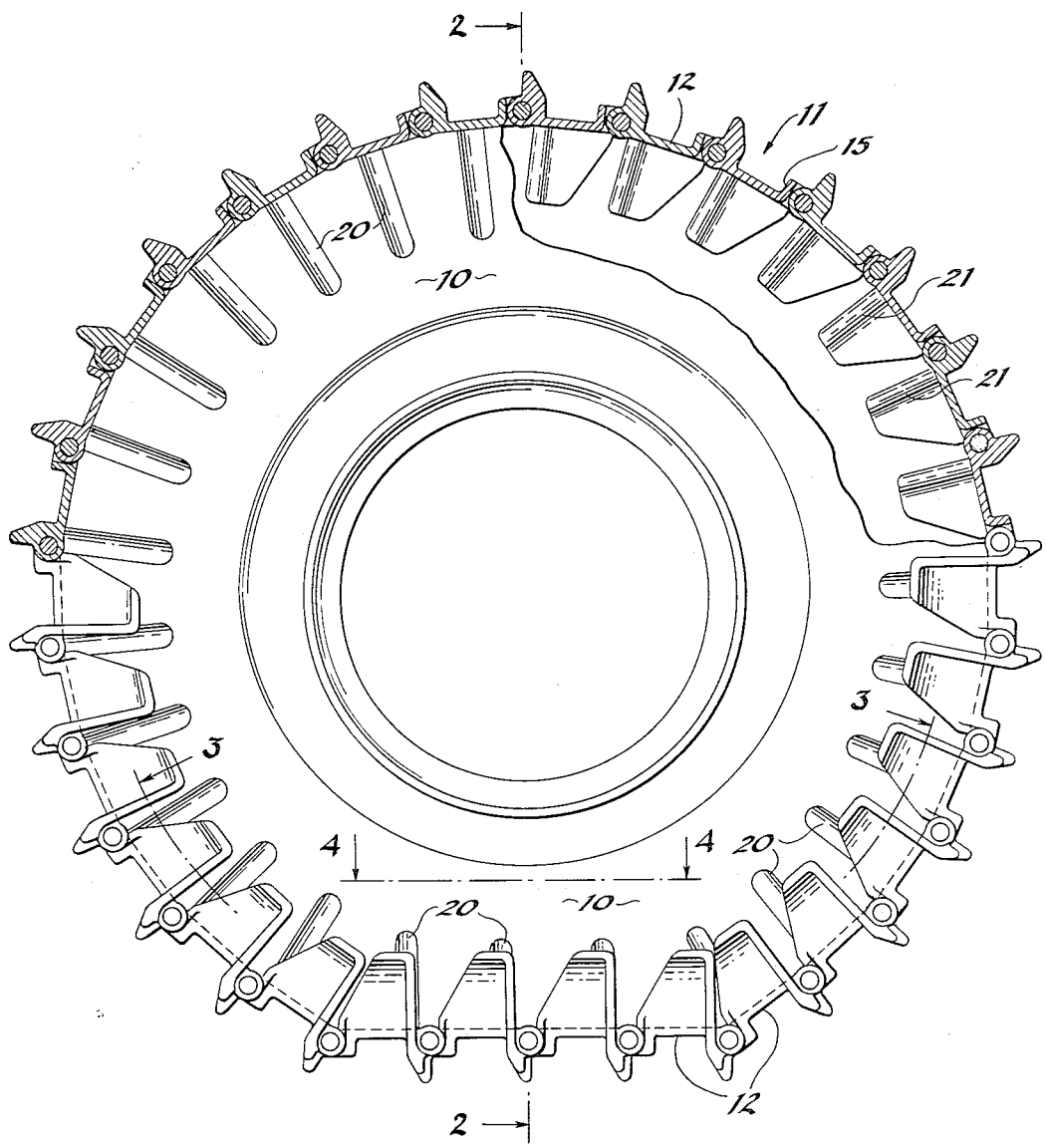

For the purpose of locking the track with the tire in driving relationship where the tire is resting flat upon the ground, I provide ribs on the wings 14 of each shoe, these ribs being adapted to enter into the grooves 20 only in the zones where the side walls meet the tread of the tire and only where the tire is flattened on the ground under load as shown at the bottom of Fig. 2. One of these ribs 21 is formed upstanding inwardly from each of the wings 14 in position to enter into the grooves 20 of the tire when it bulges laterally outwardly under load in engagement with the ground as indicated at the bottom of Fig. 2. It is well known that the grooves 20 molded in an evenly spaced arrangement around the tire, will lie somewhat closer together when the tire flattens against the ground as shown at the bottom of Fig. 1. My track is so designed that the distance between adjacent ribs 21 on the same side of the tire, as viewed in Fig. 4, have this reduced spacing of the grooves 20 in the tire when it is flattened on the ground under load.

When the tire and track are assembled as shown in Fig. 1, the track is caused to provide sufficient radially inward compression on the tire tread to cause the normal rounded contour of the tire to be flattened slightly across the flat surface 13 of the track shoe. When the vehicle is under no load or light load, some flatness in the tire section occurs thus all around the periphery of the tire casing. It is well known that the outer periphery of the tread of the tire becomes slightly less when the wheel assembly flattens against the ground under load as indicated in Figs. 1 and 2. Without my invention, this would cause a loosening of the track 11 upon the tire 10. The fact that the tire is originally flattened all around its periphery against the flat surfaces 13 of the track shoes, creates a condition so that the tire will exert a substantially constant follow-up pressure to keep the belt tight in all phases of operation. Referring to Fig. 2, where the tire 110 is flattened against the ground, the tread and side walls bulge outwardly against the wings 14 of each shoe. Some of the air in the internal chamber of the tire along the ground portion of the tire is forced around to the non-ground-engaging portions of the tire as indicated at the top of the tire in Fig. 2. This causes the tire to resume its normal rounded contour so that the tread of the tire becomes convex outwardly when viewed in section as at the top of Fig. 2. The tire thus maintains a tight engagement with the track completely around its periphery but the contact area between the tire tread and shoes of the track is quite limited as illustrated at the top of Fig. 2. This limited area of contact around a large portion of the tire reduces the friction between the tire and the track.

I utilize the bulging of the tire side walls laterally outwardly, when under engagement with the ground, to cause interlocking of the ribs 21 with the grooves 20. The parts are so designed that the ribs 21 seat substantially in the bottom of the grooves 20 along the portion of the tire flattened against the ground. Since the spacing of the ribs 21 in the track is the same as the spacing in the grooves 20 at this flattened portion of the tire, the track and tire are positively geared together at this point where the driving action occurs. Around the other portions of the track, as illustrated at the top of Fig. 2, the rounded contour of the tire holds the grooves 20 away from the ribs 21 as clearly shown in Fig. 2. Thus, the track is free to creep along the tire at the non-ground-engaging portions thereof.

In Fig. 3, I have shown at zone A the ribs 21 out of contact with the grooves 20. At the zone B, I have shown the ribs 21 as slightly out of registration with the grooves 20 where the track is bending to lie flat upon the ground. At the zone C, I have shown the ribs 21 firmly embedded in the grooves 20 at this portion of the tire. Since at least three sets of ribs 21 and grooves 20 are in positive engagement on the ground-engaging portion of the assembly at all times, a rib 21 in the zone B is forced into its appropriate groove 20 just before the track and tire flatten on the ground. At zone D, I have shown the ribs 21 slightly out of registration with their associated grooves 20 at that point where the track is leaving the ground. In the tire and track illustrated, there is a pair of ribs 21 on each shoe 12, and there is one more shoe than there are cooperating grooves 20 in the tire, for instance, 30 shoes and 29 effective grooves. This is because 29 times the average spacing of the grooves around the entire tire approximately equals 30 times the spacing between ribs 21 of adjacent shoes (or 30 times the spacing between grooves 20 at the ground-engaging portion of the tire, which is the same as the spacing of ribs 21 measured between adjacent shoes).

The ribs 21 are substantially in line with the wall 17 so that this wall provides a direct connection between the tire engaging ribs 21 and the ground-engaging grousers 17a.

What I claim is:

1. In combination, a pneumatic tire having side walls and a tread, said tire having evenly spaced grooves extending cross-wise of said tire at least in the zones where said side walls meet said tread, said tire being of a construction and having a normal working pressure such that the portion of said tire engaging the ground flattens under load so that said evenly spaced grooves temporarily lie at a reduced even spacing along said ground-flattened portion of said tire, an endless track completely surrounding and tightly engaging the circumference of said tire, said track comprising a plurality of rigid shoes and articulating connections between adjacent shoes, each of said shoes having a flat mid-portion engaging the tread of said wire, each of said shoes having end portions extending inwardly from the ends of said mid-portion and lying opposite said zones, said end portions having ridges extending inwardly therefrom and spaced at said reduced even spacing, and said ridges having such an inward extent that they have driving engagement with said grooves only at said ground-flattened portion of said tire.

2. The combination of claim 1 wherein said ridges are inclined laterally away from said flat mid-portion of said shoe, whereby the flatter the tire, the greater is the extent of the ridges engaged into said grooves.

3. A shoe for use in an endless tire track to be applied to a pneumatic tire having evenly spaced grooves extending circumferentially of said tire, said shoe having a mid-portion generally flat on its tire-engageable surface, said shoe having end portions at opposite ends of said mid-portion extending radially inwardly of the tire from said mid-portion on the tire-engageable side thereof, a wall along one side of said shoe, said wall extending downwardly beyond the mid-portion to form a ground engaging grouser, at least one ridge on each of said end portions only, said ridges extending laterally outwardly away from said mid-portion of said shoe and having a length substantially equal to said end portions, said ridges having curved tire engaging surfaces, and being substantially in alignment with said wall and the ground engaging grouser of said shoe, said ridges being spaced apart laterally by a distance greater than the tread cross section of a fully inflated pneumatic tire with which it is intended to be used, whereby said ridges enter into the grooves of the tire only when said tire bulges laterally outwardly under load in the zone of ground engagement.

References Cited in the file of this patent

UNITED STATES PATENTS

| | | |
|---|---|---|
| 1,307,036 | Bretscher | June 17, 1919 |
| 1,413,167 | Knisely | April 18, 1922 |
| 2,046,299 | Armington | June 30, 1936 |

FOREIGN PATENTS

| | | |
|---|---|---|
| 269,378 | Switzerland | Oct. 16, 1950 |
| 858,389 | France | Nov. 23, 1940 |